US011736469B2

(12) United States Patent
Maria et al.

(10) Patent No.: US 11,736,469 B2
(45) Date of Patent: *Aug. 22, 2023

(54) SINGLE SIGN-ON ENABLED OAUTH TOKEN

(71) Applicant: Oracle International Corporation, Redwood Shores, CA (US)

(72) Inventors: Mayank Maria, Bangalore (IN); Aarathi Balakrishnan, Bangalore (IN); Dharmvir Singh, Bangalore (IN); Madhu Martin, Bangalore (IN); Vikas Pooven Chathoth, Bangalore (IN); Vamsi Motukuru, Monmouth Junction, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/684,949

(22) Filed: Mar. 2, 2022

(65) Prior Publication Data

US 2022/0191188 A1 Jun. 16, 2022

Related U.S. Application Data

(63) Continuation of application No. 16/164,709, filed on Oct. 18, 2018, now Pat. No. 11,303,627.

(Continued)

(51) Int. Cl.
*H04L 29/00* (2006.01)
*H04L 9/40* (2022.01)

(52) U.S. Cl.
CPC ...... *H04L 63/0815* (2013.01); *H04L 63/0853* (2013.01); *H04L 63/108* (2013.01)

(58) Field of Classification Search
CPC ............ H04L 63/0815; H04L 63/0853; H04L 63/108

(Continued)

(56) References Cited

U.S. PATENT DOCUMENTS

| 7,685,206 B1 | 3/2010 | Mathew et al. |
| 7,784,092 B2 | 8/2010 | Pearson et al. |

(Continued)

FOREIGN PATENT DOCUMENTS

| EP | 2257026 | 12/2010 |
| WO | 2015042349 | 3/2015 |

OTHER PUBLICATIONS

Configuring Google OAuth2 for Single Sign On, Available Online at: https://support.watchmanmonitoring.eom/hc/en-us/articles/115002916983-Configuring-Google-OAuth2-for-Single-Sign-On, Feb. 19, 2018, 6 pages.

(Continued)

*Primary Examiner* — Brandon Hoffman
*Assistant Examiner* — Michael D Anderson
(74) *Attorney, Agent, or Firm* — Kilpatrick Townsend & Stockton LLP

(57) ABSTRACT

Techniques are described for providing session management functionalities using an access token (e.g., an Open Authorization (OAuth) access token). Upon successful user authentication, a session (e.g., a single sign-on session) is created for the user along with a user identity token that includes information identifying the session. The user identity token is presentable in an access token request sent to an access token issuer authority (e.g., an OAuth server). Upon receiving the access token request, the user identity token is parsed to identify and validate the session against information stored for the session. The validation can include various session management-related checks. If the validation is successful, the token issuer authority generates the (Continued)

access token. In this manner, the access token that is generated is linked to the session. The access token can then be used by an application to gain access to a protected resource.

20 Claims, 7 Drawing Sheets

Related U.S. Application Data

(60) Provisional application No. 62/678,895, filed on May 31, 2018.

(58) Field of Classification Search
USPC .............................................................. 726/4
See application file for complete search history.

(56) References Cited

U.S. PATENT DOCUMENTS

| | | |
|---|---|---|
| 7,788,494 B2 | 8/2010 | Aissi et al. |
| 7,836,484 B2 | 11/2010 | Pardo-Blazquez et al. |
| 8,364,970 B2 | 1/2013 | Fu |
| 8,474,017 B2 | 6/2013 | Schultz et al. |
| 8,533,796 B1 | 9/2013 | Shenoy et al. |
| 8,667,579 B2 | 3/2014 | Leeder |
| 8,763,102 B2 | 6/2014 | Furman et al. |
| 8,849,858 B2 | 9/2014 | Lim |
| 8,893,293 B1 | 11/2014 | Schmoyer et al. |
| 8,935,757 B2 | 1/2015 | Srinivasan et al. |
| 9,003,050 B2 | 4/2015 | Karlsson et al. |
| 9,009,806 B2 | 4/2015 | Hyland et al. |
| 9,043,886 B2 | 5/2015 | Srinivasan et al. |
| 9,197,623 B2 | 11/2015 | Srinivasan et al. |
| 9,237,145 B2 | 1/2016 | Sondhi et al. |
| 9,350,718 B2 | 5/2016 | Sondhi et al. |
| 9,374,356 B2 | 6/2016 | Sondhi et al. |
| 9,407,628 B2 | 8/2016 | Sondhi et al. |
| 9,450,963 B2 | 9/2016 | Srinivasan et al. |
| 9,525,684 B1 | 12/2016 | Brandwine |
| 9,531,697 B2 | 12/2016 | Sondhi et al. |
| 9,544,294 B2 | 1/2017 | Srinivasan et al. |
| 9,565,178 B2 | 2/2017 | Sondhi et al. |
| 9,578,014 B2 | 2/2017 | Sondhi et al. |
| 9,699,170 B2 | 7/2017 | Sondhi et al. |
| 9,769,147 B2 | 9/2017 | Mathew et al. |
| 9,860,234 B2 | 1/2018 | Sondhi et al. |
| 10,084,823 B2 | 9/2018 | Sondhi et al. |
| 2001/0056354 A1 | 12/2001 | Feit et al. |
| 2002/0101858 A1 | 8/2002 | Stuart et al. |
| 2002/0184535 A1 | 12/2002 | Moaven et al. |
| 2004/0128558 A1 | 7/2004 | Barrett |
| 2005/0060548 A1 | 3/2005 | Allen |
| 2006/0021019 A1 | 1/2006 | Hinton et al. |
| 2006/0095779 A9 | 5/2006 | Bhat et al. |
| 2006/0206931 A1 | 9/2006 | Dillaway et al. |
| 2006/0218625 A1 | 9/2006 | Pearson et al. |
| 2008/0010455 A1 | 1/2008 | Holtzman et al. |
| 2009/0193507 A1 | 7/2009 | Ibrahim |
| 2009/0292927 A1 | 11/2009 | Wenzel et al. |
| 2009/0296936 A1 | 12/2009 | Lie et al. |
| 2009/0300355 A1 | 12/2009 | Crane et al. |
| 2010/0011421 A1 | 1/2010 | Chari et al. |
| 2010/0043065 A1 | 2/2010 | Bray et al. |
| 2010/0100952 A1 | 4/2010 | Sample et al. |
| 2010/0146570 A1 | 6/2010 | Kim et al. |
| 2010/0212004 A1 | 8/2010 | Fu |
| 2011/0011421 A1 | 1/2011 | Dumas et al. |
| 2011/0067095 A1 | 3/2011 | Leicher et al. |
| 2011/0131643 A1 | 6/2011 | Lawrence et al. |
| 2011/0239283 A1 | 9/2011 | Chern |
| 2011/0296504 A1 | 12/2011 | Burch et al. |
| 2011/0314532 A1 | 12/2011 | Austin et al. |
| 2011/0314533 A1 | 12/2011 | Austin et al. |
| 2012/0005733 A1 | 1/2012 | Ross |
| 2012/0023556 A1 | 1/2012 | Schultz et al. |
| 2012/0028609 A1 | 2/2012 | Hruska |
| 2012/0066757 A1 | 3/2012 | Vysogorets et al. |
| 2012/0117626 A1 | 5/2012 | Yates et al. |
| 2012/0144034 A1 | 6/2012 | McCarty |
| 2012/0144457 A1 | 6/2012 | Counterman |
| 2012/0144501 A1 | 6/2012 | Vangpat et al. |
| 2012/0151564 A1 | 6/2012 | Robert et al. |
| 2012/0167185 A1 | 6/2012 | Menezes et al. |
| 2012/0173610 A1 | 7/2012 | Bleau et al. |
| 2012/0216268 A1 | 8/2012 | Kassaei et al. |
| 2012/0227098 A1 | 9/2012 | Obasanjo et al. |
| 2012/0233334 A1 | 9/2012 | Braudes et al. |
| 2012/0278876 A1 | 11/2012 | McDonald |
| 2012/0311663 A1 | 12/2012 | Seidl et al. |
| 2012/0331536 A1 | 12/2012 | Chabbewal et al. |
| 2013/0007846 A1 | 1/2013 | Murakami et al. |
| 2013/0014258 A1 | 1/2013 | Williams |
| 2013/0024371 A1 | 1/2013 | Hariramani et al. |
| 2013/0024919 A1 | 1/2013 | Wetter et al. |
| 2013/0036455 A1 | 2/2013 | Bodi et al. |
| 2013/0086645 A1 | 4/2013 | Srinivasan et al. |
| 2013/0086657 A1 | 4/2013 | Srinivasan et al. |
| 2013/0086669 A1 | 4/2013 | Sondhi et al. |
| 2013/0103802 A1 | 4/2013 | Kawato |
| 2013/0117826 A1 | 5/2013 | Gordon et al. |
| 2013/0125226 A1 | 5/2013 | Shah et al. |
| 2013/0160099 A1 | 6/2013 | Fitzpatrick, III |
| 2013/0160144 A1 | 6/2013 | Mok et al. |
| 2013/0212486 A1 | 8/2013 | Joshi et al. |
| 2013/0227663 A1 | 8/2013 | Cadenas Gonzalez |
| 2013/0283362 A1 | 10/2013 | Kress et al. |
| 2014/0007213 A1 | 1/2014 | Sanin et al. |
| 2014/0020073 A1 | 1/2014 | Ronda et al. |
| 2014/0025753 A1 | 1/2014 | Gronowski et al. |
| 2014/0033278 A1 | 1/2014 | Nimashakavi et al. |
| 2014/0033279 A1 | 1/2014 | Nimashakavi et al. |
| 2014/0033280 A1 | 1/2014 | Nimashakavi et al. |
| 2014/0095874 A1 | 4/2014 | Desai et al. |
| 2014/0136346 A1 | 5/2014 | Teso |
| 2014/0173753 A1 | 6/2014 | Sanso et al. |
| 2014/0187240 A1 | 7/2014 | Chen |
| 2014/0220933 A1 | 8/2014 | Lynes et al. |
| 2014/0337955 A1 | 11/2014 | Mendelovich et al. |
| 2014/0350979 A1 | 11/2014 | Paetzold et al. |
| 2014/0372367 A1 | 12/2014 | McLean et al. |
| 2014/0380428 A1 | 12/2014 | Kobayashi |
| 2014/0380429 A1 | 12/2014 | Matsugashita |
| 2015/0050972 A1 | 2/2015 | Sarrafzadeh et al. |
| 2015/0089569 A1 | 3/2015 | Sondhi et al. |
| 2015/0089570 A1 | 3/2015 | Sondhi et al. |
| 2015/0089571 A1 | 3/2015 | Srinivasan et al. |
| 2015/0089596 A1 | 3/2015 | Sondhi et al. |
| 2015/0089597 A1 | 3/2015 | Srinivasan et al. |
| 2015/0089617 A1 | 3/2015 | Sondhi et al. |
| 2015/0089622 A1 | 3/2015 | Sondhi et al. |
| 2015/0089623 A1 | 3/2015 | Sondhi et al. |
| 2015/0156190 A1 | 6/2015 | Sanso et al. |
| 2015/0200948 A1 | 7/2015 | Cairns et al. |
| 2016/0028737 A1 | 1/2016 | Srinivasan et al. |
| 2016/0080361 A1 | 3/2016 | Sondhi et al. |
| 2016/0205108 A1 | 7/2016 | Si et al. |
| 2017/0331829 A1* | 11/2017 | Lander ................ G06F 21/6218 |
| 2018/0012012 A1* | 1/2018 | Stone .................... G06F 21/41 |

OTHER PUBLICATIONS

Service-to-Service App, Available Online at: https://docs.pivotal.io/p-identity/1-2/configure-apps/service-to-service-app.html, Feb. 19, 2018, 1 page.

Single Sign On (SSO) Using OAuth, Available Online at: https://www.miniorange.com/single-sign-on-(sso)-using-oauth, Feb. 15, 2018, 3 pages.

Single Sign-On/Custom Authentication, MSDN, Available Online at: http://msdn.microsoft.com/en-us/library/bb969522(v=office.12).aspx, Apr. 2011, pp. 1-3.

Using OAuth for Single Sign-On, Available Online at: https://www.trustbuilder.com/oauth, Feb. 15, 2018, 2 pages.

(56) References Cited

OTHER PUBLICATIONS

Using Single Sign-On Access in Identity Manager, Available Online at: https://www.netiq.com/documentation/identity-manager-46/setup/data/b1av7dg3.html, Feb. 16, 2018, 2 pages.
U.S. Appl. No. 13/464,880, Final Office Action dated Aug. 29, 2014, 19 pages.
U.S. Appl. No. 13/464,880, Non-Final Office Action dated Mar. 28, 2014, 19 pages.
U.S. Appl. No. 13/631,538, Final Office Action dated May 15, 2014, 16 pages.
U.S. Appl. No. 13/631,538, Non-Final Office Action dated Jan. 2, 2014, 18 pages.
U.S. Appl. No. 13/631,538, Notice of Allowance dated Sep. 2, 2014, 8 pages.
U.S. Appl. No. 14/266,454, Final Office Action dated Mar. 17, 2016, 17 pages.
U.S. Appl. No. 14/266,454, Non-Final Office Action dated Aug. 13, 2015, 14 pages.
U.S. Appl. No. 14/266,466, Non-Final Office Action dated Jul. 17, 2015, 9 pages.
U.S. Appl. No. 14/266,466, Notice of Allowance dated Jan. 15, 2016, 9 pages.
U.S. Appl. No. 14/266,472, Non-Final Office Action dated Apr. 23, 2015, 9 pages.
U.S. Appl. No. 14/266,472, Notice of Allowance dated Jul. 8, 2015, 11 pages.
U.S. Appl. No. 14/266,478, Non-Final Office Action dated Apr. 27, 2015, 12 pages.
U.S. Appl. No. 14/266,478, Notice of Allowance dated Aug. 28, 2015, 22 pages.
U.S. Appl. No. 14/266,478, Supplemental Notice of Allowability dated Oct. 29, 2015, 4 pages.
U.S. Appl. No. 14/266,486, Non-Final Office Action dated Sep. 8, 2015, 16 pages.
U.S. Appl. No. 14/266,486, Notice of Allowance dated Feb. 24, 2016, 17 pages.
U.S. Appl. No. 14/266,496, Non-Final Office Action dated Jun. 4, 2015, 31 pages.
U.S. Appl. No. 14/266,505, Final Office Action dated Mar. 3, 2016, 17 pages.
U.S. Appl. No. 14/266,505, Non-Final Office Action dated Sep. 1, 2015, 12 pages.
U.S. Appl. No. 14/266,515, Non-Final Office Action dated Jun. 26, 2015, 37 pages.
U.S. Appl. No. 14/878,412, Notice of Allowance dated Mar. 31, 2016, 9 pages.
U.S. Appl. No. 14/951,438, Notice of Allowance dated Mar. 28, 2016, 12 pages.
U.S. Appl. No. 14/951,438, Supplemental Notice of Allowability dated Apr. 13, 2016, 2 pages.
U.S. Appl. No. 14/951,438, Supplemental Notice of Allowability dated Jul. 6, 2016, 2 pages.
U.S. Appl. No. 16/164,709, Corrected Notice of Allowability dated Mar. 3, 2022, 5 pages.
U.S. Appl. No. 16/164,709, Final Office Action dated Oct. 18, 2021, 18 pages.
U.S. Appl. No. 16/164,709, Non-Final Office Action dated Feb. 19, 2021, 19 pages.
U.S. Appl. No. 16/164,709, Notice of Allowance dated Feb. 9, 2022, 8 pages.
Bussard et al., Delegation of Access Rights in Multi-Domain Service Compositions, Available Online at: Springerlink.com, vol. 2, Issue 2, Dec. 2009, pp. 137-154.
Demchenko et al., Authorization Infrastructure for On-Demand Network Resource Provisioning, 9th IEEE/ACM International Conference on Grid Computing, Oct. 2008, pp. 95-103.
European Application No. 12773179.2, Extended European Search Report dated Jul. 14, 2015, 5 pages.
Hammer-Lahav, The OAuth 1.0 Protocol-RFC5849, Internet Engineering Task Force. Available Online at: http://tools.ietf.org/pdf/draft-hardt-oauth-01.pdf, Apr. 30, 2010, pp. 1-38.
Hammer-Lahav et al., The OAuth 2.0 Protocol draft-ietf-oauth-v2-10, Network Working Group Internet-Draft, Jul. 2010, 45 pages.
Hardt et al., OAuth Web Resource Authorization Profiles draft-hardt-oauth-01, Available Online at: https://tools.ietf.org/html/draft-hardt-oauth-01 >, Jan. 2010, 40 pages.
Hardt, The OAuth 2.0 Authorization Framework, Internet Engineering Task Force (IETF) RFC 6749, Microsoft, Available Online at: https://tools.ietf.org/html/rfc6749, Oct. 2012, pp. 1-76.
Huang, SportMingles Sports Social Network for iOS, The University of Texas at Austin, Dec. 2012, 29 pages.
Hunt, Chain Grant Type for OAuth2 draft-hunt-oauth-chain-01.txt, Internet-Draft, Oracle Corporation, Nov. 28, 2012, 10 pages.
Jaramillo et al., Cross-Platform, Secure Message Delivery for Mobile Devices, Proceedings of IEEE, Southeastcon, Apr. 2013, 7 pages.
Lodderstedt et al., OAuth 2.0 Security Considerations, Internet-Draft, Internet Engineering 1-18 Task Force (IETF), Available on Internet at: http://tools.ietf.org/pdf/draft-lodderstedt-oauth-securityconsiderations-02.pdf, Apr. 2011, 9 pages.
Mortimer et al., OAuth 2.0 Assertion Profile draft-ietf-oauth-assertions-00, OAuth 2.0 Assertion Profile draft-ietf-oauth-assertions-00.txt, Internet Engineering task force, IETF; Standard working draft, internet Society, Jul. 4, 2011, pp. 1-14.
Noureddine et al., A Provisioning Model Towards Oauth 2.0 Performance Optimization, Cybernetic intelligent Systems, 2011, IEEE 10th International Conference on, IEEE, Sep. 1, 2011, pp. 76-80.
International Application No. PCT/US2012/057754, International Search Report and Written Opinion dated May 14, 2014, 9 pages.
International Application No. PCT/US2014/056466, International Preliminary Report on Patentability dated Mar. 31, 2016, 7 pages.
International Application No. PCT/US2014/056466, International Search Report and Written Opinion dated Jan. 22, 2015, 10 pages.

\* cited by examiner

SINGLE SIGN-ON ENABLED OAUTH TOKEN

CROSS-REFERENCES TO RELATED APPLICATIONS

The present application is a non-provisional continuation of application Ser. No. 16/164,709 filed Oct. 18, 2018, entitled "SINGLE SIGN-ON ENABLED OAUTH TOKEN" and claims the benefit and priority under 35 U.S.C. 119(e) of U.S. Provisional Application No. 62/678,895, filed May 31, 2018, entitled "SSO ENABLED OAUTH TOKEN". The content of U.S. non-provisional of application Ser. No. 16/164,709 filed Oct. 18, 2018, entitled "SINGLE SIGN-ON ENABLED OAUTH TOKEN" and U.S. Provisional Application No. 62/678,895 are incorporated herein by reference in their entirety for all purposes.

BACKGROUND

Single Sign-On (SSO) provides a user with the privilege to seamlessly access multiple resources by authenticating against a single resource in a computer system. Upon successful authentication, an SSO session and a corresponding session cookie are generated for a user. The cookie can then be used in subsequent requests for access to resources during the SSO session.

Open Authorization (OAuth) on the other hand acts as an authorization protocol. Since OAuth is not an authentication protocol, generation or maintenance of a user session is not possible with, and beyond the scope of, OAuth. Tokens generated during OAuth flows act as bearer tokens and are short lived. Unlike SSO cookies, OAuth tokens do not possess any session management capabilities.

Enterprise applications often rely upon SSO sessions and SSO cookies for handling access to resources. On the other hand, cloud computing is increasingly becoming a popular alternative to traditional enterprise applications. The same SSO cookies used for accessing enterprise applications do not work for accessing cloud resources. In a cloud environment, cloud resources are accessed using access tokens, which are often generated using OAuth.

BRIEF SUMMARY

The present disclosure relates generally to techniques for providing session management functionalities using an access token. More particularly, techniques are described for enabling session management to be performed in connection with issuing an access token. Various inventive embodiments are described herein, including methods, systems, non-transitory computer-readable storage media storing programs, code, or instructions executable by one or more processors, and the like.

In certain embodiments, as part of creating a session (e.g., an SSO session) for a user upon successful authentication of the user, an additional token (e.g., a JavaScript Object Notation (JSON) Web Token, hereinafter referred to as a "JWT") is created. This additional token stores a session identifier of the session being created and may be stored along with a session cookie. For example, the additional token may be stored by an application requesting access on behalf of the user and/or by a Web browser through which the user communicates with the application. The additional token (or the session identifier information obtained from the token) is then included in access token requests (e.g., OAuth access token requests) sent for the user to an access token issuer (e.g., an OAuth server). The access token issuer may then determine the session that was created, based upon the session identifier information obtained from the token, and validate the session using session information that was stored for the session. The validation of the session can include session management-related checks. The access token issuer may issue the requested access token only upon successful validation. In this manner, session management can be performed as part of the workflow for issuing an access token.

In certain embodiments, techniques are provided for integrating OAuth with SSO, in order to leverage enterprise capabilities (e.g., session management) using OAuth access tokens. This is useful in a mixed application environment, where a first application (e.g., a Web or cloud based application) participates in an OAuth scheme whereby access to a protected resource is provided through an OAuth access token, while a second application (e.g., an enterprise application) participates in an SSO scheme whereby access to a protected resource is provided through creation of an SSO session.

In certain embodiments, an application can, through receiving session information when an SSO session is created, request an access token through an OAuth flow, where the access token is linked to the session using the session information. In this way, the session management capabilities of SSO are made available through the access token. Thus, linking SSO sessions with access tokens would enable seamless SSO between different mixes of applications. The techniques described herein may be useful for Software as a Service (SaaS) services that only support OAuth or OpenID Connect (OIDC) and that need to provide a single sign-on user experience across the SaaS services.

Linking OAuth access tokens with an SSO session would enable the OAuth access tokens to take advantage of session management capabilities. These capabilities would be tied to the access token itself, thus enhancing the functionality of the access token compared to conventional OAuth access tokens. For example, the life cycle of the access token would be linked to the life cycle of the user's SSO session. Additionally, the access token would support the functionality which was attached to the earlier established SSO session (e.g., idle timeout, max session timeout, and access token revocation via session revocation).

In certain embodiments, revocation of an access token can be performed via revocation of a session instance, since the session and the access token are now linked. If an access token isn't linked to a session, it may be possible to still use the access token as a bearer token to access resources even though the session may no longer be valid. Linking prevents this by enabling the access token to inherit the properties of the session.

In certain embodiments, the session information is sent to the application in a user identity token comprising a session identifier. The user identity token can be a JWT and may be sent to an OAuth server, which generates an access token if the session corresponding to the session identifier of the user identity token is valid. The user identity token can include additional information that supports a multi-data center environment, where there are multiple access managers residing in different data centers. This additional information can be used to locate an access manager (e.g., a server running Oracle Access Manager software) associated with the session in order to validate the session.

In certain embodiments, a method performed on a computer system (e.g., an access management system) includes receiving an access token request from an application, the access token request including information identifying a session created prior to generation of the access token request. Based on the information identifying the session, session information stored for the session is retrieved. The method further includes determining, using the session information, that the session is valid. An access token is generated in response to the determining that the session is valid. The access token provides the application with access to a protected resource (e.g., a resource protected by the computer system).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The foregoing, together with other features and embodiments, will become more apparent upon referring to the following specification, claims, and accompanying drawings.

DETAILED DESCRIPTION

Figure 1:
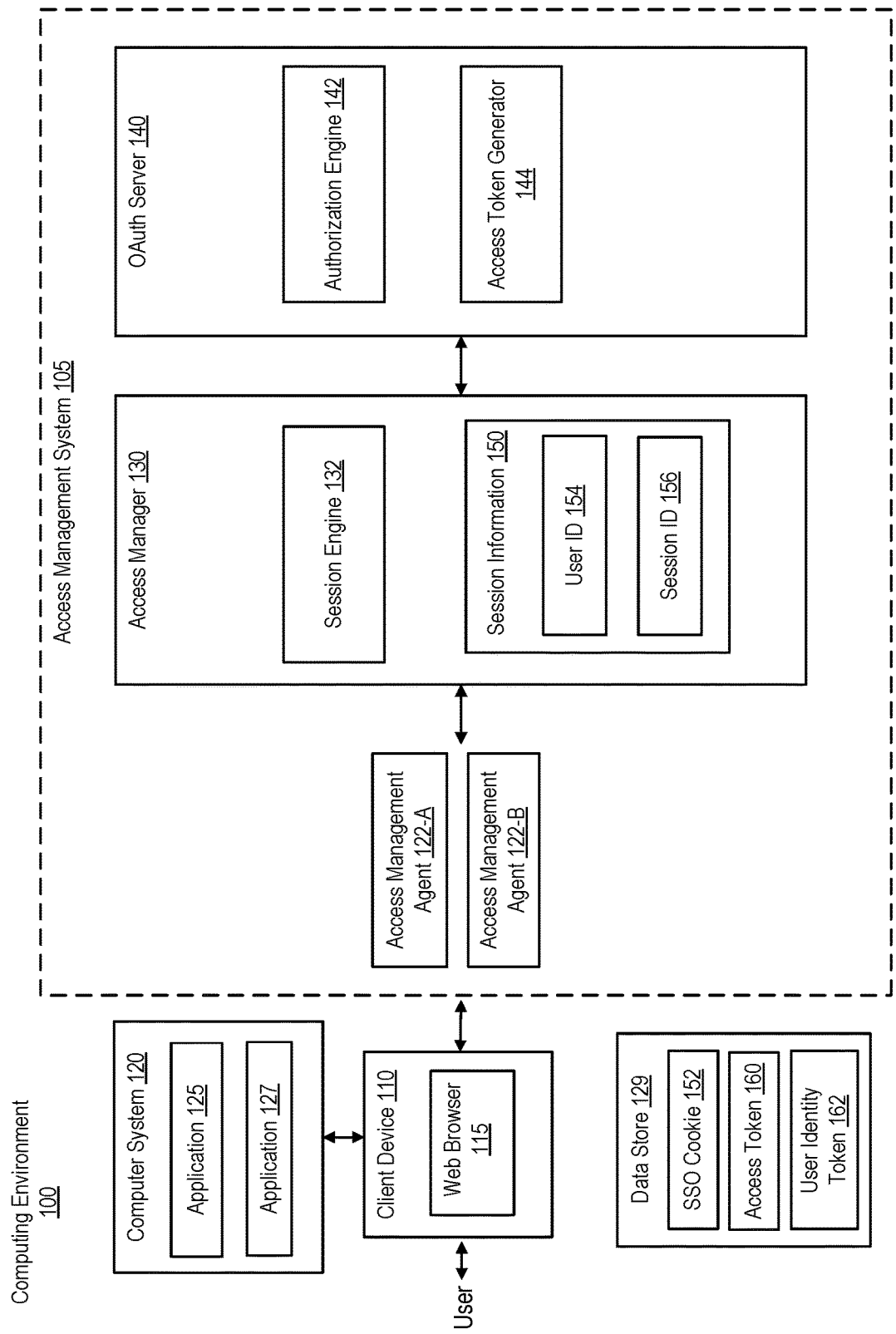
FIG. 1 is a simplified block diagram of a network environment incorporating an exemplary embodiment.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to techniques for providing session management functionalities using an access token. More particularly, techniques are described for enabling session management to be performed in connection with issuing an access token. Various inventive embodiments are described herein, including methods, systems, non-transitory computer-readable storage media storing programs, code, or instructions executable by one or more processors, and the like.

In certain embodiments, as part of creating a session (e.g., an SSO session) for a user upon successful authentication of the user, an additional token (e.g., a JavaScript Object Notation (JSON) Web Token, hereinafter referred to as a "JWT") is created. This additional token stores a session identifier of the session being created and may be stored along with a session cookie. For example, the additional token may be stored by an application requesting access on behalf of the user and/or by a Web browser through which the user communicates with the application.

The additional token (or the session identifier information obtained from the token) is then included in access token requests (e.g., OAuth access token requests) sent for the user to an access token issuer (e.g., an OAuth server). The access token issuer may then determine the session that was created, based upon the session identifier information obtained from the token, and validate the session using session information that was stored for the session. The validation of the session can include session management-related checks. The access token issuer may issue the requested access token only upon successful validation. In this manner, session management can be performed as part of the workflow for issuing an access token.

In certain embodiments, techniques are provided for integrating OAuth with SSO, in order to leverage enterprise capabilities (e.g., session management) using OAuth access tokens. This is useful in a mixed application environment, where a first application (e.g., a Web or cloud based application) participates in an OAuth scheme whereby access to a protected resource is provided through an OAuth access token, while a second application (e.g., an enterprise application) participates in an SSO scheme whereby access to a protected resource is provided through creation of an SSO session.

In certain embodiments, an application can, through receiving session information when an SSO session is created, request an access token through an OAuth flow, where the access token is linked to the session using the session information. In this way, the session management capabilities of SSO are made available through the access token. Thus, linking SSO sessions with access tokens would enable seamless SSO between different mixes of applications. The techniques described herein may be useful for Software as a Service (SaaS) services that only support OAuth or OpenID Connect (OIDC) and that need to provide a single sign-on user experience across the SaaS services.

Linking OAuth access tokens with an SSO session would enable the OAuth access tokens to take advantage of session management capabilities. These capabilities would be tied to the access token itself, thus enhancing the functionality of the access token compared to conventional OAuth access tokens. For example, the life cycle of the access token would be linked to the life cycle of the user's SSO session. Additionally, the access token would support the functionality which was attached to the earlier established SSO session (e.g., idle timeout, max session timeout, and access token revocation via session revocation).

In certain embodiments, revocation of an access token can be performed via revocation of a session instance, since the session and the access token are now linked. If an access token isn't linked to a session, it may be possible to still use the access token as a bearer token to access resources even though the session may no longer be valid. Linking prevents this by enabling the access token to inherit the properties of the session.

In certain embodiments, the session information is sent to the application in a user identity token comprising a session identifier. The user identity token can be a JWT and may be sent to an OAuth server, which generates an access token if the session corresponding to the session identifier of the user identity token is valid. The user identity token can include additional information that supports a multi-data center environment, where there are multiple access managers residing in different data centers. This additional information can be used to locate an access manager (e.g., a server running Oracle Access Manager software) associated with the session in order to validate the session.

As used herein, "flow" refers to a procedure including one or more steps for performing some action in a computing environment. A flow can involve any number of data processing steps and/or decision making steps. For example, an OAuth flow may involve performing an authorization procedure (e.g., applying an authorization policy) to generate an access token for a user after the user has been successful authenticated based on one or more user credentials or based on one or more user assertions. An OAuth flow may also involve providing access to a protected resource based on the access token. However, as mentioned earlier, OAuth is not an authentication protocol, so generation or maintenance of a user session is not possible using OAuth. Possession of the access token indicates that the user has been authorized to access the protected resource. Generally, there is no upper bound on the number of access tokens that can be generated through OAuth for a particular user.

An SSO flow may involve authenticating the user using one or more user credentials in order to create an SSO session along with a corresponding SSO cookie that enables the user to access additional resources without having to re-authenticate during the session. Upon successful authentication, an SSO session is created for the user. Unlike OAuth, there is a limit on the number of sessions a user can have simultaneously. SSO cookies support session lifecycle management, including: idle timeout (sometimes referred to as inactivity timeout, e.g., the session is revoked when the user has been idle for a specified length of time corresponding to a timeout value), max session timeout (which defines an upper limit on the timeout value for any particular session), application timeout (which is a timeout for a specific application executed during a session), forceful session removal (e.g., revocation of a user session through an administrator console), and inactivity timeout.

Systems depicted in some of the figures may be provided in various configurations. In certain embodiments, the systems may be configured as a distributed system where one or more components of the system are distributed across one or more networks in a cloud computing environment. A distributed system may include an access management system comprising one or more access managers (e.g., a server running Oracle Access Manager (OAM) software). The access managers can be located in one or more data centers. In a multi-data center scenario, the data centers may be dispersed over different geographic locations. Various resources within a computer network may be managed and/or stored by the one or more data centers. In certain embodiments, the systems may be configured to operate in virtual or non-virtual environments.

Resources can include any item managed and/or stored by data centers and made available for access by one or more users. Examples of such items include files (e.g., documents, spreadsheets, and images), computational resources (e.g., processing power, cloud storage, and network communication bandwidth), software applications, and/or the like. A resource may be protected or unprotected. If a resource is protected, a user may have to be authenticated and authorized in order to access the resource. If a resource is unprotected, a user may access the resource without having to be authenticated and authorized. Requests for access to resources can be generated in response to user interaction with an application. For example, an access request can be generated when the user attempts to run an application by selecting, via the user's browser, a Uniform Resource Locator (URL) associated with the application.

FIG. 1 is a simplified block diagram of a computing environment 100 incorporating an exemplary embodiment. The computing environment 100 includes a client device 110 operated by a user, a computer system 120 configured to execute one or more applications (e.g., an application 125 and an application 127), and an access management system 105 comprising one or more access managers 130 and one or more OAuth servers 140. The client device 110 may include a Web browser 115 or other client application through which the user can interact with the applications 125 and 127.

The systems and devices depicted in FIG. 1 may be communicatively coupled to each other via one or more communication networks (not shown). Examples of communication networks include, without restriction, the Internet, a wide area network (WAN), a local area network (LAN), an Ethernet network, a public or private network, a wired network, a wireless network, and the like, and combinations thereof. In general, the various systems and devices depicted in FIG. 1 can be communicatively coupled to each other by any infrastructure that facilitates communications between coupled components.

The access management system 105 further includes one or more access management agents 122 (e.g., an access management agent 122-A and an access management agent 122-B) that intercept access requests and redirect the access requests to an access manager such as the access manager 130. Access requests may be generated, for example, by the applications 125 and 127 for access to protected resources in response to user input at client device 110. An access management agent may be implemented, for example, as a standalone device, a computer system, or a software application hosted by a computer system or server. In some embodiments, the access management agent is a WebGate that is communicatively coupled to the Web browser 115. An access management agent 122 may intercept access requests associated with a particular application in order to protect the resources used by that application. For example, the access management agent 122-A may intercept access requests associated with the application 125 while the access management agent 122-B intercepts access requests associated with the application 127.

The access management agents 122 may be located on the same server or computer system. Alternatively, access management agents 122 may be located on different servers or computer systems. Additionally, access management agents 122 can be implemented on the same server or computer system as an access manager (e.g., access manager 130). Similarly, although shown as being part of the computer system 120, the applications 125 and 127 may reside on the same or different servers or computer systems. Thus, it is understood that other arrangements and implementations of access managers, access management agents, and applications are possible in alternative embodiments.

The application 125 may be a Web based application that is executed by a computer of the computer system 120 and that is configured to access resources during an SSO session in order to provide application functionality. For example, the application 125 could be a data analytics program that obtains data from a remote server and processes the data to generate graphical output for display on the Web browser 115. The application 125 may determine whether a resource can be accessed based on one or more security artifacts (e.g., an SSO cookie 152 stored in a data store 129). For example, access may be granted when the data store 129 contains a valid cookie generated by the session engine 132 in response to an earlier authentication of the user. The SSO cookie 152 may be configured based on information about the user and/or the SSO session including, for example, a user identifier (ID) such as a username, a session creation time, and a session validity period (e.g., an idle timeout duration and/or a session expiration time).

The SSO cookie 152 may be encrypted using information known to the access manager 130, but not the application 125 (e.g., an encryption key maintained by the access manager 130). When the user attempts to access application functionality that requires access to a protected resource, the application 125 may check for the existence of the SSO cookie 152, then send the SSO cookie 152 to the access management system 105 (e.g., to access manager 130 via one of the access management agents 122) for validation. If the access management system 105 responds with an indication that the SSO cookie is valid, then application 125 will be granted access to the protected resource. The SSO cookie 152 may be accessible to multiple enterprise applications or other applications participating in an SSO scheme, so that once the user has been authenticated against a protected resource, the same cookie may be used for accessing protected resources associated with the other applications.

The application 127 may be a cloud based application that does not participate in the SSO scheme used by the application 125, but instead relies on OAuth access tokens for obtaining access to protected resources. The application 127 may communicate with the Web browser 115 to provide application functionality to the user. Alternatively, the application 127 may be a mobile application with a corresponding client application installed on the client device 110. In order to access protected resources associated with the application 127, the user may be required to obtain authorization through an OAuth flow in which an access token 160 is generated (e.g., by OAuth server 140) for the user after the user has been successfully authenticated. The access token 160 may be stored in a data store accessible to the application 127, e.g., data store 129.

The data store 129 may further store a user identity token 162. As explained later in connection with FIG. 2, a user identity token may be used to generate an access token that is linked to an SSO session. For convenience, the SSO cookie 152, the access token 160, and the user identity token 162 are shown in FIG. 1 as being stored together in the data store 129. However, it is understood that other storage configurations are also possible. For example, the SSO cookie 152, the access token 160, and the user identity token 162 could be stored in separate data stores or locations. Further, different entities may be responsible for storing and/or maintaining the SSO cookie 152, the access token 160, and the user identity token 162. For example, the client device 110 may store the SSO cookie 152 (e.g., in a browser cache of Web browser 115), while the application 125 or 127 stores the access token 160 and the user identity token 162 (e.g., in a memory space of computer system 120 allocated for use by the application 125 or 127).

The access manager 130 may include a session engine 132 and a data store storing session information 150, which includes a user ID 154 and a session ID 156. The access manager 130 performs authentication and authorization operations in connection with access requests for resources associated with SSO applications, e.g., the application 125. The access manager 130 can perform authentication and authorization by comparing user supplied credentials to stored credential information for the user. The access manager 130 may be implemented on a server that has the processing, memory, and communication capabilities to perform authentications and authorizations. The server may be a physical server implemented as one or more computer systems having various hardware components, or a virtualized server that is instantiated on one or more computer systems, or any other arrangement or combinations of arrangements.

The session engine 132 is configured to create an SSO session in response to successful authentication of the user by the access manager 130. The session engine 132 may configure the SSO session based on an access policy. For example, the access policy may specify that for a particular user or group of users the session should having a certain maximum timeout duration (e.g., a max session timeout parameter), a certain idle timeout duration, a certain application timeout duration, etc. The session information 150 is maintained by the access manager 130 and can be stored locally or on a remote data store accessible to the access manager 130. The session engine 132 may also be configured to perform session management by, for example, enforcing the access policy whenever an access request is received by the access manager 130.

When the SSO session is created, the access manager 130 may generate one or more cookies for the session (e.g., the SSO cookie 152) and send the cookie(s) to the application that is requesting access on behalf of the user. The session cookies can be configured according to the session information. For example, as mentioned earlier, the SSO cookie 152 may be configured based on information such as a user ID, a session creation time, and a session validity period.

The OAuth server 140 is communicatively coupled to the access manager 130 and the computer system 120. The OAuth server 140 includes an authorization engine 142 configured to perform an authorization operation in response to receiving an access request from an application participating in an OAuth scheme, e.g., the application 127. The OAuth server 140 further includes an access token generator 144 configured to generate an access token (e.g., access token 160) in response to successful authorization. The OAuth server 140 may send the access token to the application for use in requesting access to the protected resource. As explained in connection with FIG. 2, an access token can be generated based on a user identity token containing information that causes the access token to be linked to an SSO session for which the user identity token was generated. In certain embodiments, the OAuth server 140 may store token information for access tokens that it generates. This token information could be used to validate the access tokens when the access tokens are subsequently presented to the OAuth server 140.

The OAuth server 140 can be implemented on a physical or virtual server and, in some embodiments, may reside on the same server as the access manager 130. For example, the access manager 130 (including session engine 132) and the OAuth server 140 can be implemented on a single server executing programs included in an Oracle Access Management software suite. Thus, it may be possible that the access manager 130 and the OAuth server 140 share access to information generated in connection with authentication and authorization operations. For example, the access manager 130 may share the session information 150 with the OAuth server 140. In other embodiments, the OAuth server 140 and the access manager 130 may work in cooperation with each other without sharing session information. For example, the access manager 130 and the OAuth server 140 may be separate service providers on separate servers. In that case, the OAuth server could leverage session management capabilities of the session engine 132 as a service, e.g., through Representational State Transfer (REST) application programming interface (API) calls, assuming that trust has been established between the access manager 130 and OAuth server 140.

Figure 2:
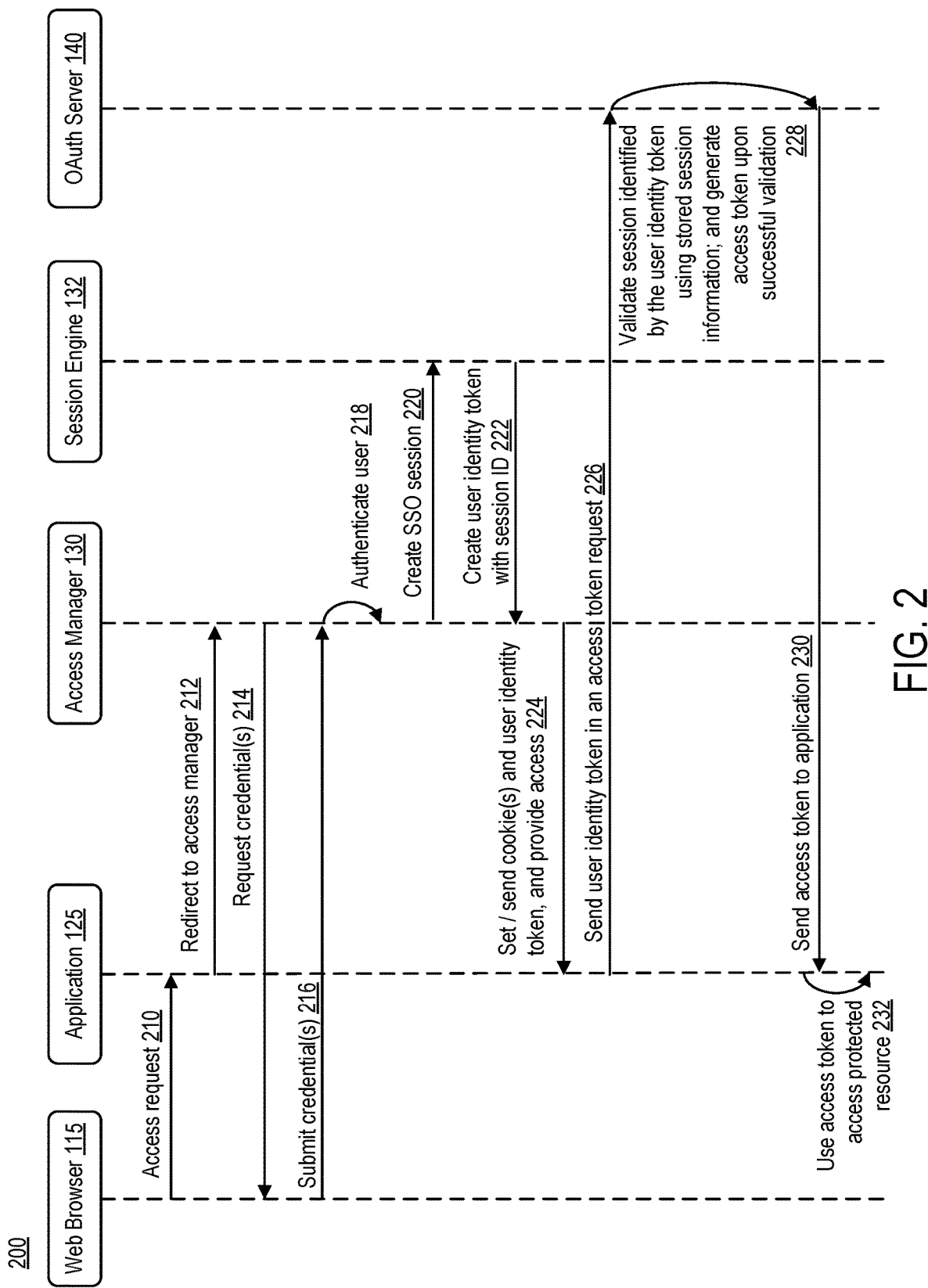
FIG. 2 is a sequence diagram illustrating linking of an access token with a session, in accordance with an embodiment.
Figure 3:
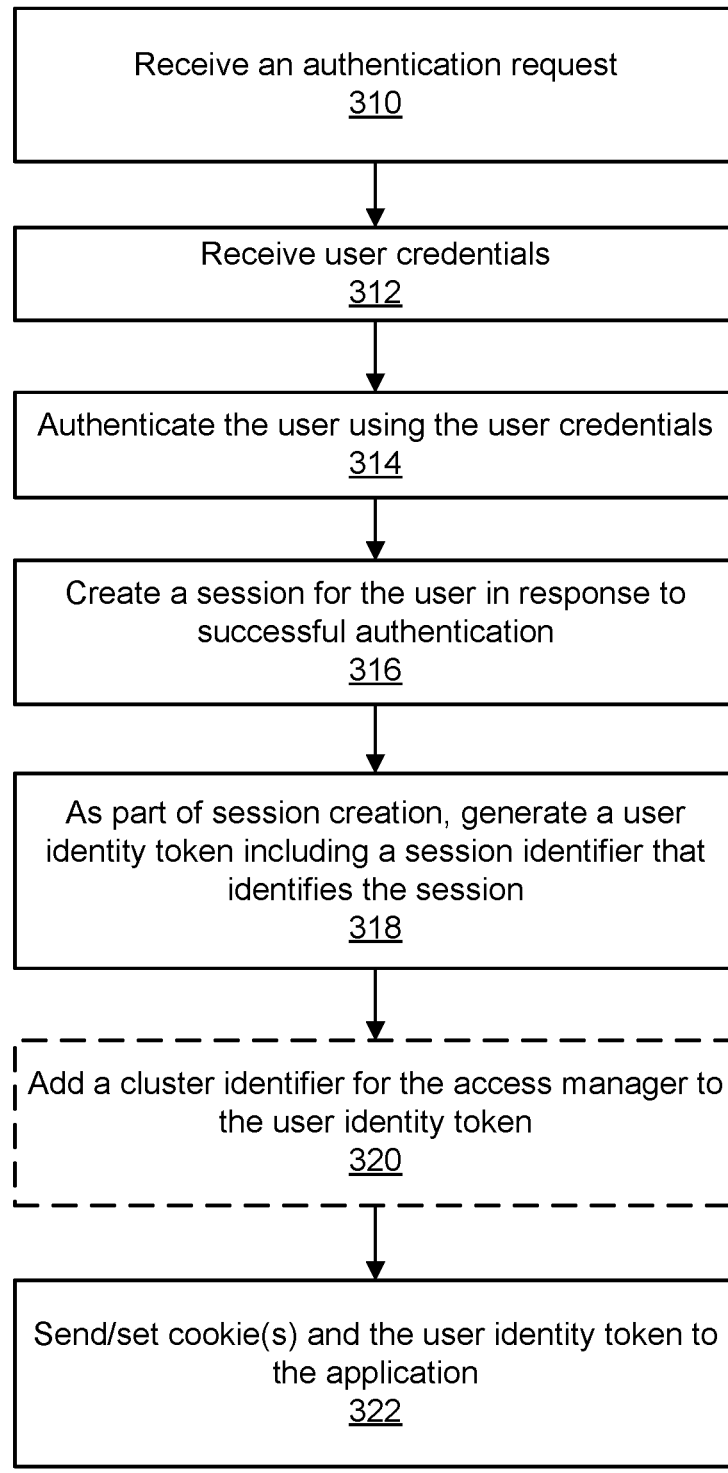
FIG. 3 is a flowchart of a method for generating a user identity token, in accordance with an embodiment.
Figure 4:
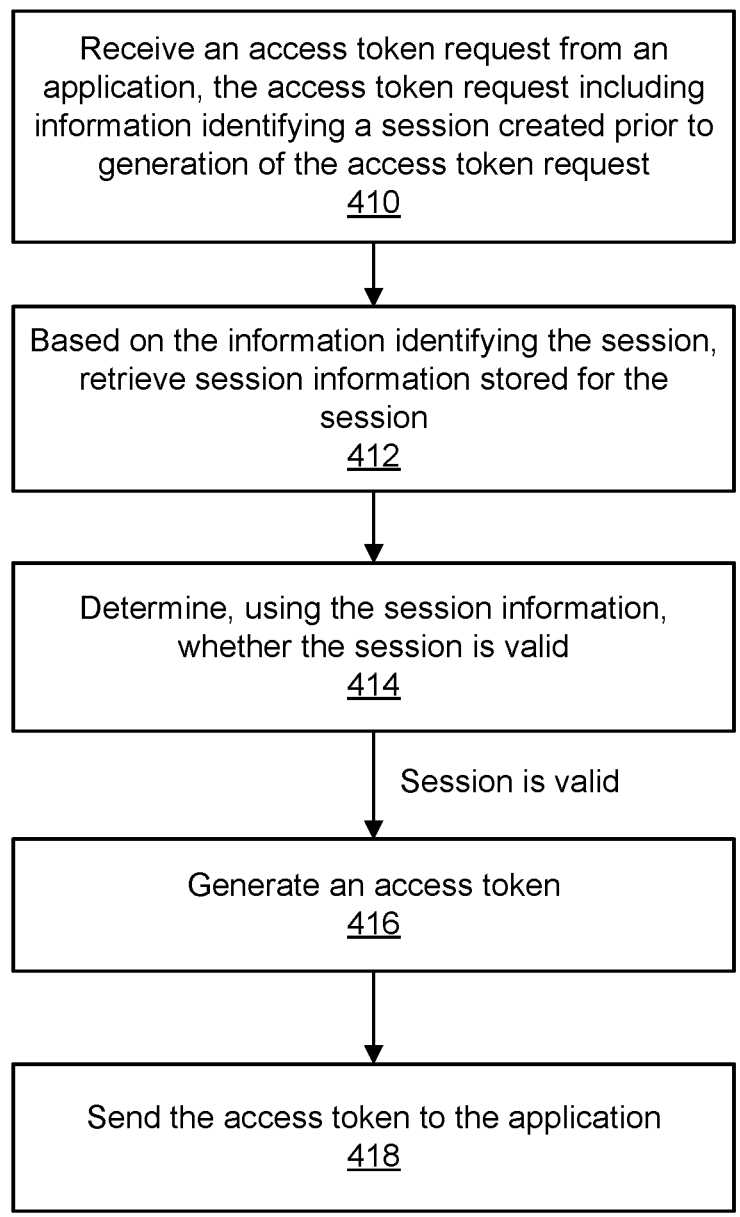
FIG. 4 is a flowchart of a method for generating a session linked access token, in accordance with an embodiment.

Example flowcharts and sequence diagrams depicting processing for linking an access token to a session so as to enable session management using the access token will now be described in connection with FIGS. 2 to 4. The processing depicted in FIGS. 2 to 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). Although FIGS. 2 to 4 depict various processing steps occurring in a particular sequence or order, this is not intended to be limiting. In alternative embodiments, some steps may be performed in a different order or in parallel. In certain embodiments, such as the embodiment depicted in FIG. 1, the processing depicted in FIGS. 2 to 4 may be performed by one or more components of an access management system (e.g., access manager 130 and/or OAuth server 140), a client device (e.g., client device 110), an application executed on behalf of a user of the client device (e.g., application 125), or a combination thereof.

FIG. 2 is a sequence diagram illustrating a process 200 for linking an access token with a session, in accordance with an embodiment. The process 200 can be performed, for example, in the computing environment 100 of FIG. 1. At step 210, the user requests, via a Web browser (e.g., Web browser 115), access to a resource protected by an access manager (e.g., access manager 130). The request is sent through an application communicatively coupled to the Web browser (e.g., application 125) and may be intercepted by a WebGate (e.g., access manager 122-A).

At step 212, the access request is redirected (e.g., by the WebGate that intercepted the access request) to the access manager 130 to initiate authentication of the user.

At step 214, the access manager 130 sends a request for one or more user credentials. The request may cause the application 125 to output a login page on the Web browser 115. The login page may include a field for inputting each requested credential, e.g., a username field and a password field.

At step 216, the user submits his or her credentials to the access manager 130 through the Web browser 115.

At step 218, the access manager 130 authenticates the user based on the user provided credentials.

At step 220, the session engine 132 of the access manager 130 creates an SSO session for the user in response to the successful authentication in step 218. As part of the session creation, the session engine may create an SSO cookie (e.g., the SSO cookie 152). For example, if the access manager 130 is an OAM server, the OAM server may generate an "OAM_ID" cookie. When the SSO session is created, the access manager 130 may store information for the session, e.g., stored as session information 150.

At step 222, the session engine creates a user identity token (e.g., user identity token 162). The user identity token can be created along with the session and, in some embodiments, is a JWT. Tokens can include one or more claims, which are assertions that an entity makes about itself or another entity. In particular, the user identity token can include one or more claims that identify the user for whom the session was created, hence the label "user identity" token. For example, the user information may be contained in a subject field of the user identity token. In certain embodiments, the user identity token is a JWT that includes a session ID as part of its claims. The session ID included in the user identity token corresponds to the session ID for the session created in step 220.

At step 224 the access manager 130 may set or send one or more cookies for the application 125 along with the user identity token. For example, the access manager 130 may send the SSO cookie from step 220 to the application 125 (e.g., for storage by the application 125 or for forwarding to the Web browser 115 for storage on client device 110). The user identity token can be sent in various ways, for example, as a separate cookie or in a header of a token response to the application 125. The token response can default to using a header until the WebGate indicates that cookies will be accepted. Headers are more secure since the header information is not usually made available to a Web browser, but is instead sent to an application without going through a Web browser. Along with setting/sending the cookies and the user identity token, the access manager 130 may provide access to the resource identified by the access request in step 210.

In certain embodiments, the access management system references configuration information to determine whether session linking has been enabled and, if so, the manner in which the user identity token is set/sent. The configuration information can include one or more challenge parameters and can be specified, for example, in an authentication scheme that the access management system applies to incoming requests for which authentication is required. As an illustrative example, the following challenge parameters can be used to configure an access manager to request OAuth access tokens that are linked to SSO sessions and send a JWT in the header of a token response:

IS_OAUTH_OAM_SSO_LINK_ENABLED=true
IS_OAUTH_USER_ASSERTION_ENABLED=true
OAUTH_TOKEN_RESPONSE_TYPE=header As an alternative to using a user identity token, it is possible to send session information (e.g., the session ID) directly to the application 125. However, a user identity token, in particular a JWT, may support signatures and other functionality and has the advantage of being able to be used as a bearer token. The application 125 may be responsible for securely storing the user identity token since the user identity token is effectively a master token from which access tokens can be generated.

At step 226, the application 125 may send the user identity token as a user assertion in an access token request to the OAuth server 140, initiating an OAuth flow. The access token request may be generated when the application 125 requires access to a resource protected by the OAuth server 140, e.g., a cloud based resource for which an access token is required. The user identity token created in step 222 can be used by the application 125 to request multiple access tokens. For example, a subsequent access request for another resource protected by the OAuth server 140 may trigger a second OAuth flow using the same user identity token to request a second access token of a different scope, e.g., an access token with different access privileges. The application 125 may send the user identity token to the OAuth server 140 using, for example, REST API calls. In some embodiments, the user identity token may be forwarded to the OAuth server 140 through a trusted intermediary, e.g., the access manager 130.

At step 228, the OAuth server 140 validates a session identified in the user identity token against session information stored for the session (e.g., session information 150) and generates an access token upon successful validation. For example, if the user identity token has a session ID, the OAuth server knows that the user identity token was generated for the session identified by the session ID. Thus, the OAuth server 140 may check the user identity token for a session ID, then send the user identity token or the session ID to the access manager 130 in order to receive a response from the access manager 130, the response indicating whether the session ID in the user identity token matches the session ID of a session represented in the session information 150 and whether the session is still valid. Alternatively, the OAuth server 140 may itself perform the validation if the OAuth server 140 has access to the session information 150. Session management-related checks can also be performed as part of session validation. Such checks may include, for example, determining whether a session expiration time has been reached and whether the session has timed out. For example, if the session has been idle for more than some configured value (e.g., an idle timeout of 15 minutes), when the user identity token is checked for validity the check will fail because the rules of the session are also applied to the access token being requested. If the user identity token is invalid, no access token will be generated.

As part of the validation process, the OAuth server 140 and/or the access manager 130 may check the session information 150 to determine whether the session with the matching session ID is a session that is associated with the user. For example, a subject associated with the SSO session (e.g., the user ID 154) can be compared with a subject field in the user identity token. The subject of the SSO session identifies the user for whom the user identity token was generated. If the subjects match and all other requirements for validation of the session are satisfied, a session linked access token is generated for the user in step 228. In this way, access tokens will only be generated for the same user, not another user.

As described above in connection with step 228, various checks can be performed so that the issuing of the access token is conditioned upon successful completion of the checks.

Because the access token is generated by validating the session identified in the user identity token, the access token and the session are implicitly linked. Additionally, in certain embodiments, the access token and the session may be explicitly linked using stored information. For example, a session ID or other session information could be added to the access token to enable session management-related checks to be performed if the access token is sent back to the access management system (e.g., to OAuth server 140 or to access manager 130) for any reason. In certain embodiments, the access token can be sent back to the access management system 105 for the purpose of re-validating the session in response to the access token being presented in an access request for accessing a resource. If the session cannot be re-validated, the access request may be denied and the assess management system may indicate that the access token is invalid.

As another example, mapping information could be stored which indicates to the application 125 and/or the access management system 105 that the access token is mapped to the session. This mapping information could enable session management-related checks to be performed post-issuance of the access token. For example, when a session is revoked, the mapping information could be referenced in order to identify and revoke the access token, thereby revoking the access token along with the session and preventing continued use of the access token when the session is no longer valid.

At step 230, the OAuth server 140 sends the access token to the application 125 to enable the application 125 to use the access token for accessing a protected resource at step 232.

In some embodiments, the session information in the user identity token (e.g., the session ID and an additional claim described below in connection with multi-data center environments) may be encrypted using an encryption key. This key could be seeded to the OAuth server 140 the first time the OAuth server starts up, as part of a bootstrapping process. For example, the access manager 130 may store a default OAuth key-certificate from which the access manager 130 obtains a Default Identity Domain private key used to sign the user identity token. When the user identity token is subsequently received at the OAuth server, an X5T value (an X.509 certificate thumbprint used to identify specific certificates) can be retrieved from a header of the user identity token and the associated public key fetched to decrypt the session information and verify the user identity token.

Although described in connection with the application 125, the process 200 can be adapted for generating SSO session linked access tokens for applications that do not use SSO cookies for accessing resources. For example, upon successful user authentication, a user identity token including a session ID could be generated for the application 127. The session ID may correspond to a newly created SSO session or an existing SSO session. For example, the session ID may correspond to an SSO session created based on authentication of the user in connection with an access request from application 127. Such a session could be created without sending or setting an SSO cookie. Alternatively, an SSO cookie could still be sent/set, but the application 127 would not use the SSO cookie. As another example, the session ID may correspond to an existing SSO session created when the user was authenticated earlier in connection with an access request from the application 125. Having obtained a user identity token, the application 127 could then present the user identity token to request an access token using an OAuth flow, with the resulting access token being linked to an SSO session in the same manner discussed above with respect to generating a session linked access token for application 125.

Embodiments support the generation of a session linked access token in a multi-data center (MDC) environment. In an MDC environment, there may be multiple access managers (e.g., OAM servers, or other physical or virtual servers) residing in different data centers. Each data center may include multiple access managers grouped into one more clusters. Authentication and authorization requests may be directed to the access managers through a load balancer, which can be centrally located or reside in a data center.

Session linking can be enabled in an MDC environment by adding an additional claim to the user identity token. This additional claim may contain the cluster ID of the machine on which the session was anchored (e.g., the identifier of the cluster in which the access manager that created the session is located). The additional claim can also include a reference (e.g., a URL) to a user identity store that stores information by which the user identified in the subject field of the user identity token can be authenticated. When the user identity token is sent back in an access token request, the access manager 130 or OAuth server 140 receiving the user identity token may not be the same server as the one that created the session. The server receiving the user identity token can, in addition to retrieving the session ID claim, also retrieve the cluster ID from the additional claim and retrieve the session based on the session ID and the cluster ID. Once the session is retrieved, its validity can be determined by performing the same checks described earlier.

In an MDC environment, the determination of session validity can be performed by the server/access manager receiving the user identity token or the server/access manager that created the session. For example, the server receiving the user identity token can make a backend call to the server that created the session, which performs the session validation and returns a validation result to the server receiving the user identity token. Alternatively, the server that created the session may send the session information to the server that received the user identity token to enable the server receiving the user identity token to perform session validation. The same checks described earlier can be performed to determine whether the session is valid. For example, the subject associated with the SSO session can be compared with the subject field in the user identity token. If the subjects match (and all other validation requirements are satisfied), an access token is generated for the user and sent to the application.

FIG. 3 is a flowchart of a method 300 for generating a user identity token, in accordance with an embodiment. The method 300 can be performed by an access manager, such as the access manager 130 of FIG. 1. At step 310, the access manager receives an authentication request from an application. The authentication request may have been triggered by a user's request to access a resource protected by the access manager, and may have been sent to the access manager by an access management agent (e.g., the access management agent 122) that intercepted the access request.

At step 312, the access manager receives one or more user credentials from the user.

At step 314, the access manager authenticates the user using the one or more user credentials received in step 312.

At step 316, the access manager creates a session for the user. The session can be an SSO session created, for example, using the session engine 132. The session may be configured based on an access policy that defines, for example, a validity period, an idle timeout duration, and other parameters of the session. The creation of the SSO session may include generating one or more session cookies, e.g., an SSO cookie.

At step 318, the access manager generates, as part of the session creation, a user identity token including a session ID that identifies the session. The user identity token is created along with the session, i.e., contemporaneously with step 316, and can be a JWT with the session ID embedded as a claim.

At step 320, the access manager may, optionally, add to the user identity token a cluster ID that identifies a cluster to which the access manager belongs. Other information by which the access manager can be located may be added in addition or as an alternative to the cluster ID.

At step 322, the access manager sets or sends the session cookie(s) along with the user identity token for the application to use in the future (e.g., as part of an access token request). The user identity token can be sent as a cookie or in a header of a token response. For example, if the application accepts SSO cookies, the access manager may send the user identity token along with the SSO cookie in a cookie package. The user identity token may be sent encrypted (e.g., encrypted using a security artifact known to the access manager, but not the application) and stored in a data store accessible to the application. The application can subsequently present the user identity token when it needs access to a protected resource for which an access token is required. The user identity token may be shared with other applications that support SSO so that the other applications can also present the user identity token in connection with an access token request.

FIG. 4 is a flowchart of a method 400 for generating a session linked access token, in accordance with an embodiment. The method 400 can generally be performed by an access management system. In particular, the steps depicted in FIG. 4 may be performed by an OAuth server, such as the OAuth server 140 of FIG. 1. At step 410, the access management system receives an access token request from an application. For example, the access token request may be sent to the OAuth server 140 in response to an access request for a resource protected by the OAuth server 140 and for which an access token is required. The access token request includes information identifying a session created prior to generation of the access token request. For example, the information identifying the session may include a session ID contained within a user identity token (e.g., a JWT) that was previously generated in connection with SSO authentication of the user.

At step 412, the access management system retrieves session information that has been stored for the session. The retrieving of the session information is performed based on the information identifying the session. For example, in certain embodiments, the OAuth server 140 may parse a user identity token to determine the session ID of an SSO session created by an access manager. The access token request may also include information by which the access manager that created the session can be identified or located, e.g., a cluster ID associated with a cluster of an OAM server that created the session.

At step 414, the access management system determines, using the session information retrieved in step 412, whether the session is valid. In particular, the session may be validated by performing one or more of the checks described earlier. For example, if the information identifying the session is provided in a user identity token, the OAuth server 140 may determine whether the user identified in the user identity token matches the user associated with the session, e.g., based on a comparison between a subject field in the user identity token and a subject of the session. The validation of the session may involve communicating with the access manager that created the session (e.g., to request that the checks be performed by the access manager on behalf of the OAuth server). If the session is determined to be invalid for any reason, the access token request is denied and no access token is generated. However, if the session is determined to be valid, the method proceeds to step 416.

At step 416, the access management system generates an access token for the user (e.g., using the access token generator 144 in OAuth server 140). The access token is generated in response to a determination in step 414 that the session is valid.

At step 418, the access management system sends the access token to the application for storage. The access token can be stored in the same data store as the user identity token or in a separate data store, and enables the application to access the protected resource.

Figure 5:
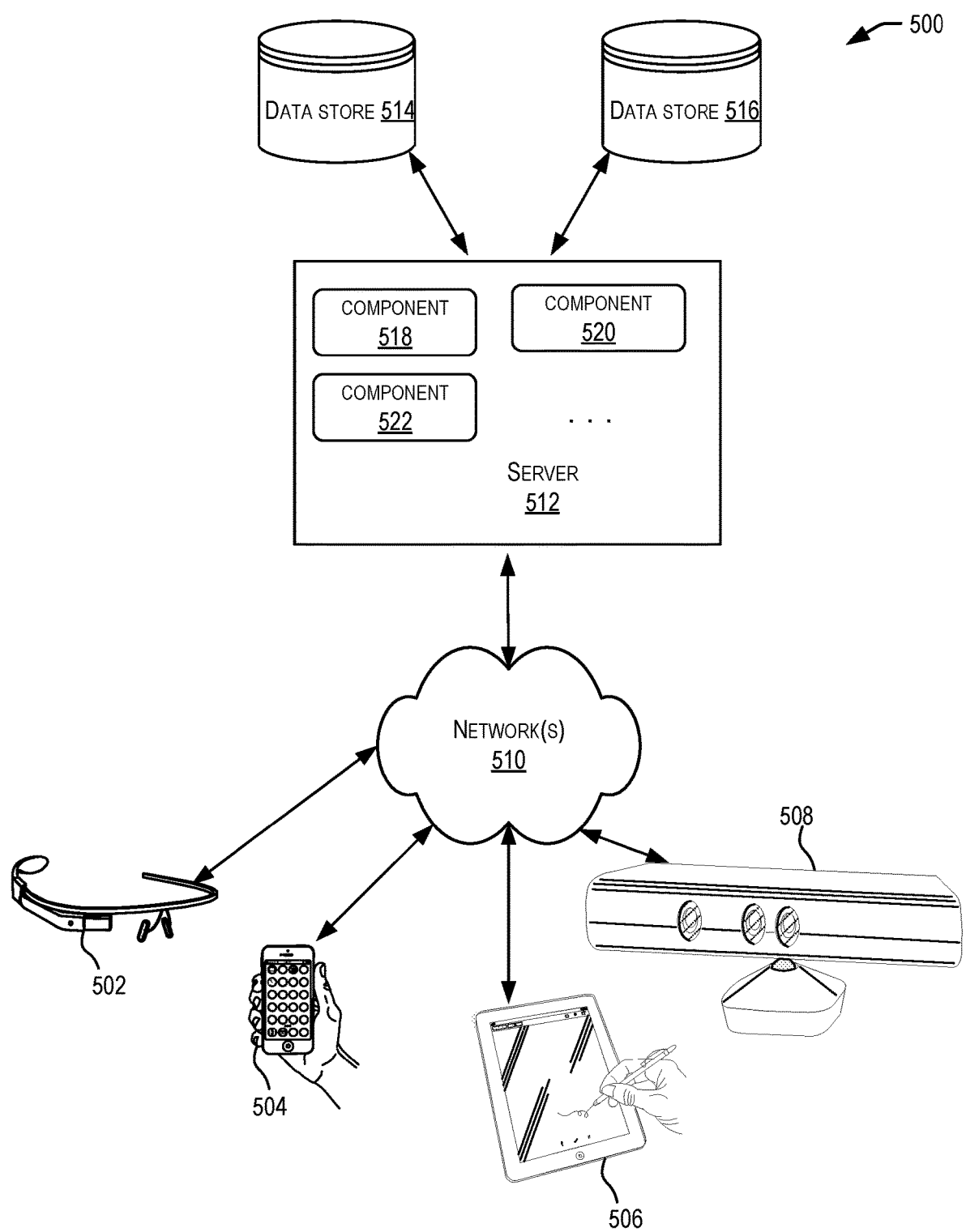
FIG. 5 is a simplified diagram of a distributed system for implementing an embodiment.

FIG. 5 is a simplified diagram of a distributed system 500 for implementing an embodiment. In the illustrated embodiment, distributed system 500 includes one or more client computing devices 502, 504, 506, and 508, which are configured to execute and operate a client application such as a Web browser, proprietary client (e.g., Oracle Forms), or the like over one or more network(s) 510. Server 512 may be communicatively coupled with remote client computing devices 502, 504, 506, and 508 via network 510.

In various embodiments, server 512 may be adapted to run one or more services or software applications that enable linking of a session with an access token. Server 512 can include one or more computers on which embodiments of the access management system 105 illustrated in FIG. 1 are implemented. For example, the server 512 may correspond to a server of the computer system 120 and/or a server of the access management system 105 (e.g., the access manager 130 or the OAuth server 140).

In certain embodiments, server 512 may also provide other services or software applications that can include non-virtual and virtual environments. In some embodiments, these services may be offered as Web-based or cloud services or under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in FIG. 5, server 512 may include one or more components 518, 520 and 522 that implement the functions performed by server 512. These components may include software components that may be executed by one or more processors, hardware components, or combinations thereof. It should be appreciated that various different system configurations are possible, which may be different from distributed system 500. The embodiment shown in FIG. 5 is thus one example of a distributed system for implementing an embodiment system and is not intended to be limiting.

Users may use client computing devices 502, 504, 506, and/or 508 to request an OAuth access token that is linked to an SSO session in accordance with the teachings of this disclosure. A client device may provide an interface that enables a user of the client device to interact with the client device. The client device may also output information to the user via this interface. Although FIG. 5 depicts only four client computing devices, any number of client computing devices may be supported.

Client computing devices 502, 504, 506, and/or 508 may include various types of computing systems such as portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 502, 504, 506, and 508 may be any other electronic device, such as a thin-client computer, an Internet-enabled gaming system (e.g., a Microsoft Xbox gaming console with or without a Kinect® gesture input device), and/or a personal messaging device, capable of communicating over network(s) 510. The client devices may be capable of executing various different applications such as various Internet-related apps, communication applications (e.g., E-mail applications, short message service (SMS) applications) and may use various communication protocols.

Network(s) 510 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 510 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the IEEE 802.11 suite of protocols, Bluetooth®, and/or any other wireless protocol), and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 512 can include one or more virtual machines running virtual operating systems, or other computing architectures involving virtualization. One or more flexible pools of logical storage devices can be virtualized to maintain virtual storage devices for the server. Virtual networks can be controlled by server 512 using software defined networking. In various embodiments, server 512 may be adapted to run one or more services or software applications that provide the functionality described in the foregoing disclosure.

The computing systems implementing server 512 may run one or more operating systems including any of those discussed above, as well as any commercially available server operating system. Server 512 may also run any of a variety of additional server applications and/or mid-tier applications, including HTTP servers, FTP servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more data repositories 514 and 516. These data repositories may be used to store data and other information in certain embodiments. For example, one or more of the data repositories 514, 516 may be used to store session information used to link an access token to a session. In some embodiments, data repositories 514 and 516 may be databases. Data stores 514 and 516 may reside in a variety of locations. For example, a data repository used by server 512 may be local to server 512 or may be remote from server 512 and in communication with server 512 via a network-based or dedicated connection. Data repositories 514, 516 may be of different types. In certain embodiments, a data repository used by server 512 may be a database, for example, a relational database, such as databases provided by Oracle Corporation® and other vendors. One or more of these databases may be adapted to enable storage, update, and retrieval of data to and from the database in response to SQL-formatted commands.

Figure 6:
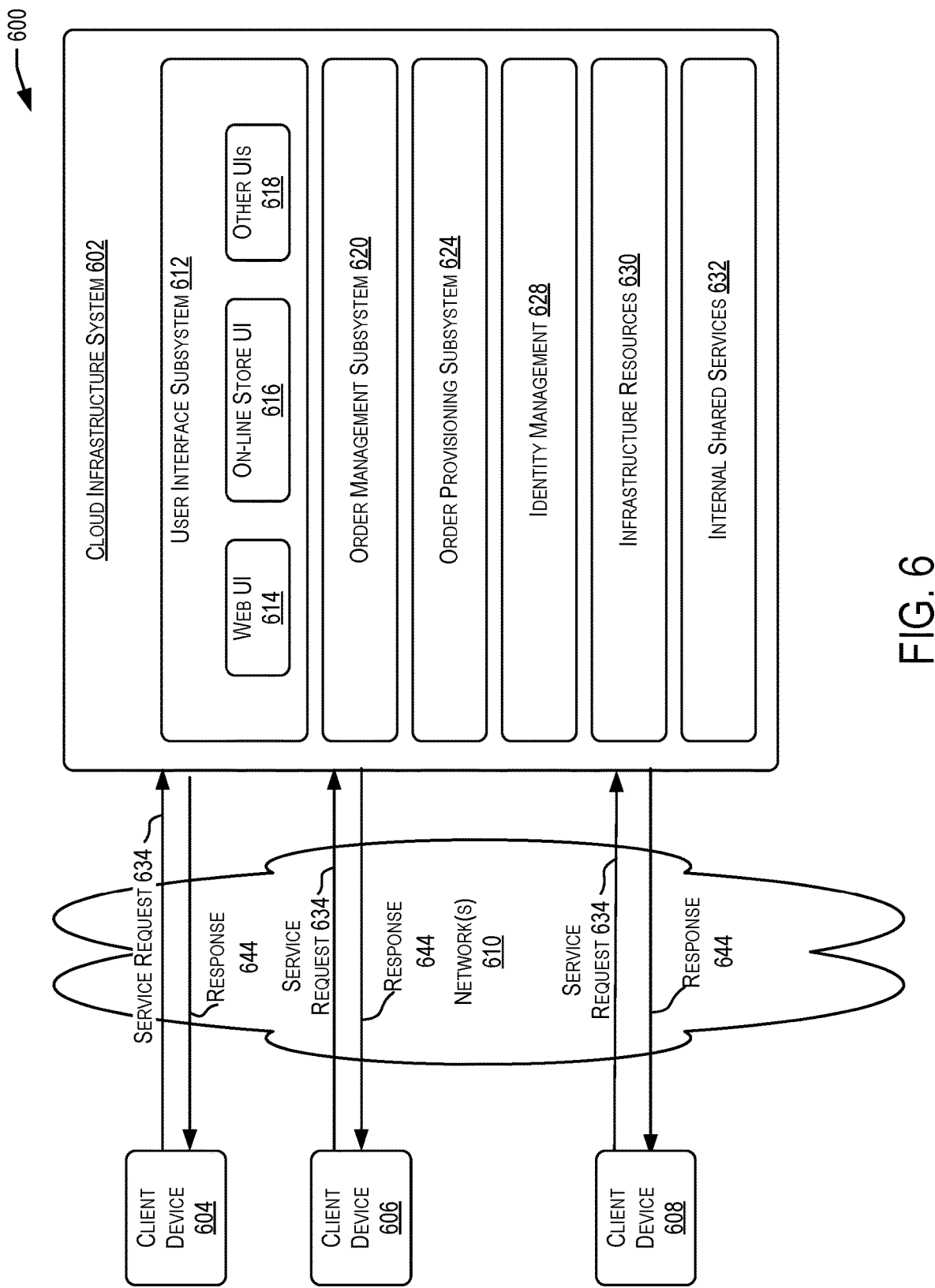
FIG. 6 is a simplified block diagram of a system environment by which session management-related services may be offered as cloud services, in accordance with certain embodiments.

In certain embodiments, the session management-related functionalities described in this disclosure may be offered as services via a cloud environment. FIG. 6 is a simplified block diagram of a cloud-based system environment 600 in which various session management-related services may be offered as cloud services, in accordance with certain embodiments. In the embodiment depicted in FIG. 6, cloud infrastructure system 602 may provide one or more cloud services that may be requested by users using one or more client computing devices 604, 606, and 608. Cloud infrastructure system 602 may comprise one or more computers and/or servers that may include those described above for server 512. The computers in cloud infrastructure system 602 may be organized as general purpose computers, specialized server computers, server farms, server clusters, or any other appropriate arrangement and/or combination.

Network(s) 610 may facilitate communications and exchange of data between clients devices 604, 606, and 608 and cloud infrastructure system 602. Each network may be any type of network familiar to those skilled in the art that can support data communications using any of a variety of commercially-available protocols, including those described above for network(s) 510.

The embodiment depicted in FIG. 6 is only one example of a cloud infrastructure system and is not intended to be limiting. It should be appreciated that, in some other embodiments, cloud infrastructure system 602 may have more or fewer components than those depicted in FIG. 6, may combine two or more components, or may have a different configuration or arrangement of components. For example, although FIG. 6 depicts three client computing devices, any number of client computing devices may be supported in alternative embodiments.

The term cloud service is generally used to refer to a service that is made available to users on demand and via a communication network such as the Internet by systems (e.g., cloud infrastructure system 602) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 602 may provide one or more cloud services using different models such as under a Software as a Service (SaaS) model, a Platform as a Service (PaaS) model, an Infrastructure as a Service (IaaS) model, and others, including hybrid service models. Cloud infrastructure system 602 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 602. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure. For example, a customer, via a subscription order, may order one or more services provided by cloud infrastructure system 602. Cloud infrastructure system 602 then performs processing to provide the services requested in the customer's subscription order. For example, a customer may place a subscription order to enable session linking for a particular application that the customer uses. Cloud infrastructure system 602 may be configured to provide one or multiple cloud services.

Cloud infrastructure system 602 may provide the cloud services via different deployment models. In a public cloud model, cloud infrastructure system 602 may be owned by a third party cloud services provider and the cloud services are offered to any general public customer, where the customer can be an individual or an enterprise. In certain other embodiments, under a private cloud model, cloud infrastructure system 602 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 602 and the services provided may be shared by several organizations in a related community. Various other models such as hybrids of the above mentioned models may also be used.

Client computing devices 604, 606, and 608 may be of different types (such as devices 502, 504, 506, and 508 depicted in FIG. 5) and may be capable of operating one or more client applications. A user may use a client device to interact with cloud infrastructure system 602, such as to request a service provided by cloud infrastructure system 602. For example, a user may use a client device to request a session management-related service described in this disclosure.

In some embodiments, the processing performed by cloud infrastructure system 602 for providing session management-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 602 for selecting or adjusting session lifecycle characteristics (e.g., a timeout duration) based on analysis of user behavior during sessions. The data used for this analysis may include structured data (e.g., data stored in a database or structured according to a structured model) and/or unstructured data (e.g., data blobs (binary large objects)).

As depicted in the embodiment in FIG. 6, cloud infrastructure system 602 may include infrastructure resources 630 that are utilized for facilitating the provision of various cloud services offered by cloud infrastructure system 602. Infrastructure resources 630 may include, for example, processing resources, storage or memory resources, networking resources, and the like.

In certain embodiments, to facilitate efficient provisioning of these resources for supporting the various cloud services provided by cloud infrastructure system 602 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 602 may itself internally use services 632 that are shared by different components of cloud infrastructure system 602 and which facilitate the provisioning of services by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 602 may comprise multiple subsystems. These subsystems may be implemented in software, or hardware, or combinations thereof. As depicted in FIG. 6, the subsystems may include a user interface subsystem 612 that enables users or customers of cloud infrastructure system 602 to interact with cloud infrastructure system 602. User interface subsystem 612 may include various different interfaces such as a Web interface 614, an online store interface 616 where cloud services provided by cloud infrastructure system 602 are advertised and are purchasable by a consumer, and other interfaces 618. For example, a customer may, using a client device, request (service request 634) one or more services provided by cloud infrastructure system 602 using one or more of interfaces 614, 616, and 618. For example, a customer may access the online store, browse cloud services offered by cloud infrastructure system 602, and place a subscription order for one or more services offered by cloud infrastructure system 602 that the customer wishes to subscribe to. The service request may include information identifying the customer and one or more services that the customer desires to subscribe to. For example, a customer may place a subscription order for a session management-related service offered by cloud infrastructure system 602. As part of the order, the customer may provide information identifying a specific application or a specific set of users for which/whom linking of access tokens is permitted.

In certain embodiments, such as the embodiment depicted in FIG. 6, cloud infrastructure system 602 may comprise an order management subsystem (OMS) 620 that is configured to process a new order. As part of this processing, OMS 620 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 620 may then invoke the order provisioning subsystem (OPS) 624 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 624 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 602 may send a response or notification 644 to the requesting customer to indicate when the requested service is now ready for use. In some instances, information (e.g., a link) may be sent to the customer that enables the customer to start using and availing the benefits of the requested services. In certain embodiments, for a customer requesting the session management-related service, the response may include a confirmation that linking of access tokens has been enabled.

Cloud infrastructure system 602 may provide services to multiple customers. For each customer, cloud infrastructure system 602 is responsible for managing information related to one or more subscription orders received from the customer, maintaining customer data related to the orders, and providing the requested services to the customer. Cloud infrastructure system 602 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 602 may provide services to multiple customers in parallel. Cloud infrastructure system 602 may store information for these customers, including possibly proprietary information. In certain embodiments, cloud infrastructure system 602 comprises an identity management subsystem (IMS) 628 that is configured to manage customers information and provide the separation of the managed information such that information related to one customer is not accessible by another customer. IMS 628 may be configured to provide various security-related services such as identity services, such as information access management, authentication and authorization services, services for managing customer identities and roles and related capabilities, and the like.

Figure 7:
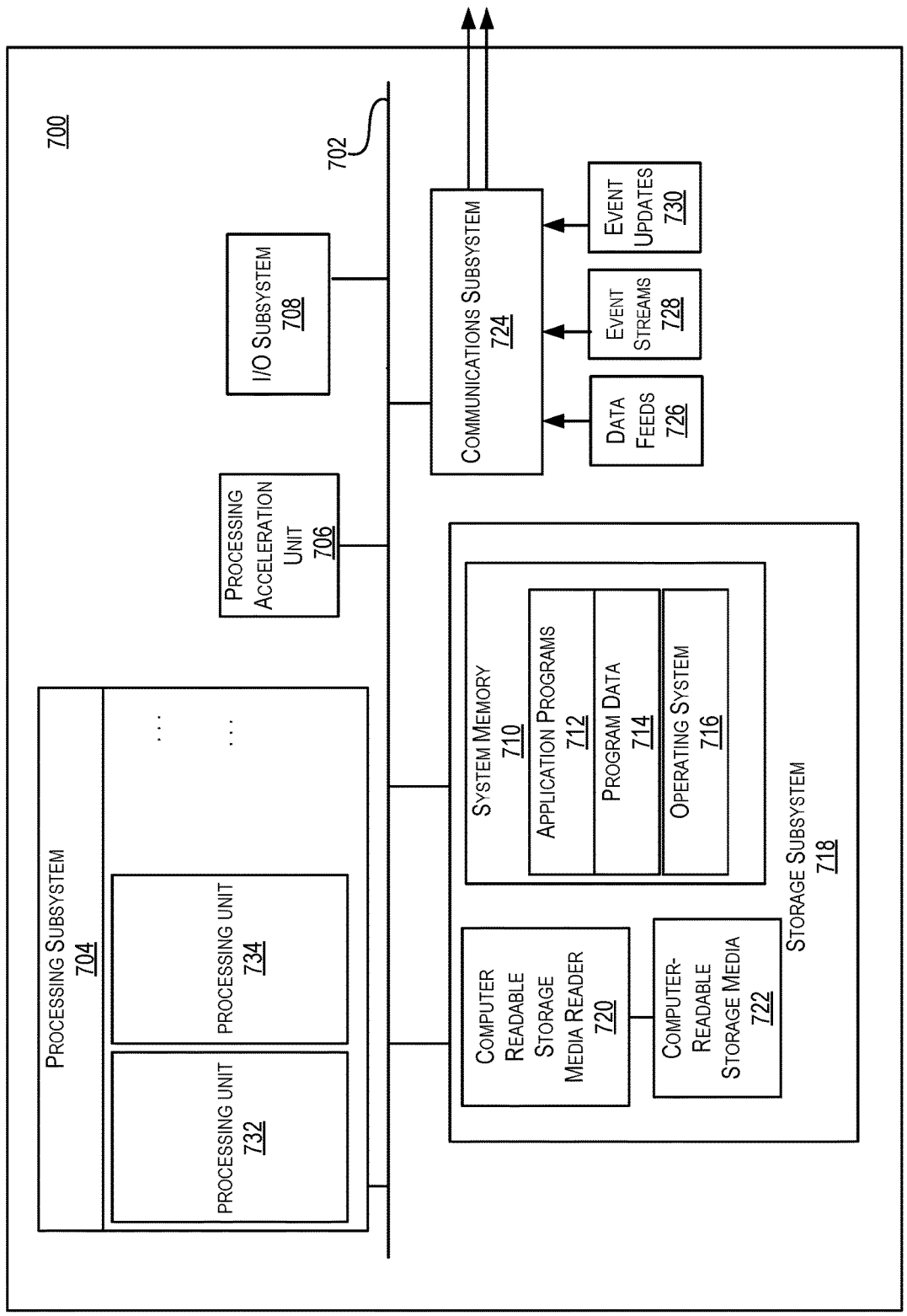
FIG. 7 illustrates an exemplary computer system that can be used to implement certain embodiments.

FIG. 7 illustrates an exemplary computer system 700 that may be used to implement certain embodiments. The computer system 700 may be used to implement any of the computer systems described above, such as the computer system 120 and the access management system 105 depicted in FIG. 1. As shown in FIG. 7, computer system 700 includes various subsystems including a processing subsystem 704 that communicates with a number of other subsystems via a bus subsystem 702. These other subsystems may include a processing acceleration unit 706, an input/output (I/O) subsystem 708, a storage subsystem 718, and a communications subsystem 724. Storage subsystem 718 may include non-transitory computer-readable storage media including storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may include be single core or multicore processors. The processing resources of computer system 700 can be organized into one or more processing units 732, 734, etc. A processing unit may include one or more processors, one or more cores from the same or different processors, a combination of cores and processors, or other combinations of cores and processors. In some embodiments, processing subsystem 704 can include one or more special purpose co-processors such as graphics processors, digital signal processors (DSPs), or the like. In some embodiments, some or all of the processing units of processing subsystem 704 can be implemented using customized circuits, such as application specific integrated circuits (ASICs), or field programmable gate arrays (FPGAs).

In some embodiments, the processing units in processing subsystem 704 can execute instructions stored in system memory 710 or on computer readable storage media 722. In various embodiments, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above. In instances where computer system 700 is executing one or more virtual machines, one or more processing units may be allocated to each virtual machine.

In certain embodiments, a processing acceleration unit 706 may optionally be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google) Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 700 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some embodiments. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM), dynamic random access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 722 may store programming and data constructs that provide the functionality of some embodiments. Computer-readable media 722 may provide storage of computer-readable instructions, data structures, program modules, and other data for computer system 700. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, DVD, a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 718 may also include a computer-readable storage media reader 720 that can further be connected to computer-readable storage media 722. The storage media reader 720 may receive and be configured to read data from a memory device such as a disk, a flash drive, etc.

In certain embodiments, computer system 700 may support virtualization technologies, including but not limited to virtualization of processing and memory resources. For example, computer system 700 may provide support for executing one or more virtual machines. In certain embodiments, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices. For example, the communications subsystem 724 may be used to transmit a user identity token (e.g., a JWT).

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

Communication subsystem 724 can receive and transmit data in various forms. For example, in some embodiments, in addition to other forms, communications subsystem 724 may receive input communications in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook° updates, Web feeds such as Rich Site Summary (RSS) feeds, and/or real-time updates from one or more third party information sources.

In certain embodiments, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A computer-implemented method comprising:
receiving, by an application, from an access management system, a user identity token, the user identity token including information identifying a user and a session identifier associated with a Single Sign-On (SSO) session;
storing, by the application, the user identity token;
sending, by the application, to the access management system, an access token request, the access token request including the session identifier associated with the SSO session, wherein the access management system retrieves session information associated with the SSO session based on the session identifier, and determines that the SSO session is valid based on the session information, wherein the access management system determines the SSO session is valid by determining a session expiration time based on the session information, by determining that the session expiration time has not yet been reached, by determining a timeout duration based on the session information, and by determining that the SSO session has not timed out based upon the timeout duration;
receiving, by the application, from the access management system, if the SSO session is valid, an access token that enables the application to access to a protected resource, the access token being different from the user identity token; and
using, by the application, the access token to access the protected resource.

2. The method of claim 1, wherein the access token request includes the user identity token.

3. The method of claim 1, wherein the access management system determines the SSO session is valid by identifying the user associated with the SSO session based on the session information, and by determining that the user identified in the user identity token matches the user associated with the SSO session.

4. The method of claim 1, wherein the user identity token is a JavaScript Object Notation (JSON) Web Token.

5. The method of claim 1, wherein the access token is an Open Authorization (OAuth) access token.

6. The method of claim 1, wherein the using the access token to access the protected resource includes providing the access token in an access request.

7. The method of claim 1, wherein the access management system generates the access token based on the user identity token, thereby causing the access token to be linked to the SSO session.

8. The method of claim 1, wherein the access management system includes an access manager and an OAuth server, the user identity token is generated by the access manager, and the access token is generated by the OAuth server.

9. The method of claim 1, wherein the application is a Web-based application being executed by a computer, and further comprising:
using, by the application, the protected resource to provide application functionality.

10. The method of claim 1, wherein the application is a data analytics program, and further comprising:
processing the protected resource to generate graphical output for display on a Web browser.

11. A computer system comprising:
one or more processors; and
a memory coupled to the one or more processors, the memory storing instructions that, when executed by the one or more processors, cause the one or more processors to:
receive, from an access management system, a user identity token, the user identity token including information identifying a user and a session identifier associated with a Single Sign-On (SSO) session;
store the user identity token;
send, to the access management system, an access token request, the access token request including the session identifier associated with the SSO session, wherein the access management system retrieves session information associated with the SSO session based on the session identifier, and determines that the SSO session is valid based on the session information, wherein the access management system determines the SSO session is valid by determining a session expiration time based on the session information, by determining that the session expiration time has not yet been reached, by determining a timeout duration based on the session information, and by determining that the SSO session has not timed out based upon the timeout duration;
receive, from the access management system, if the SSO session is valid, an access token that enables access to a protected resource, the access token being different from the user identity token; and
use the access token to access the protected resource.

12. The computer system of claim 11, wherein the user identity token is received in a header of a token response or in a session cookie.

13. The computer system of claim 11, wherein the access management system determines the SSO session is valid by determining that the user identified in the user identity token matches the user associated with the SSO session.

14. The computer system of claim 11, wherein the access token request includes the user identity token, the user identity token is a JavaScript Object Notation (JSON) Web Token, and the access token is an Open Authorization (OAuth) access token.

15. A non-transitory computer-readable storage medium storing instructions that, when executed by one or more processors of a computer system, cause the one or more processors to perform processing comprising:
receiving, from an access management system, a user identity token, the user identity token including information identifying a user and a session identifier associated with a Single Sign-On (SSO) session;
storing the user identity token;
sending, to the access management system, an access token request, the access token request including the session identifier associated with the SSO session, wherein the access management system retrieves session information associated with the SSO session based on the session identifier, and determines that the SSO session is valid based on the session information, wherein the access management system determines the SSO session is valid by determining a session expiration time based on the session information, by determining that the session expiration time has not yet been reached, by determining a timeout duration based on the session information, and by determining that the SSO session has not timed out based upon the timeout duration;
receiving, from the access management system, if the SSO session is valid, an access token that enables access to a protected resource, the access token being different from the user identity token; and
using the access token to access the protected resource.

16. The non-transitory computer-readable storage medium of claim 15, the processing further comprising:
before sending the access token request, receiving, from the user, a request to access the protected resource.

17. The non-transitory computer-readable storage medium of claim 15, the processing further comprising:
receiving, from the access management system, a request for user credentials;
outputting a login page on a web browser, the login page including one or more credential input fields;
receiving, from the user, the user credentials via the login page; and
sending, to the access management system, the user credentials, where the access management system authenticates the user based on the user credentials and creates the SSO session for the user in response to a successful authentication.

18. The method of claim 1, wherein the access token request includes the user identity token.

19. The computer system of claim 11, wherein the access token request includes the user identity token.

20. The non-transitory computer-readable storage medium of claim 15, wherein the access token request includes the user identity token.

* * * * *

UNITED STATES PATENT AND TRADEMARK OFFICE
CERTIFICATE OF CORRECTION

| | | |
|---|---|---|
| PATENT NO. | : 11,736,469 B2 | Page 1 of 1 |
| APPLICATION NO. | : 17/684949 | |
| DATED | : August 22, 2023 | |
| INVENTOR(S) | : Maria et al. | |

It is certified that error appears in the above-identified patent and that said Letters Patent is hereby corrected as shown below:

On the Title Page

Column 2, under Item (56) Other Publications, Line 2, delete ".eom" and insert -- .com --, therefor.

In the Specification

In Column 22, Line 46, delete "Google)" and insert -- Google --, therefor.

In Column 25, Line 6, delete "Facebook°" and insert -- Facebook® --, therefor.

Signed and Sealed this
Ninth Day of July, 2024

Katherine Kelly Vidal
*Director of the United States Patent and Trademark Office*